United States Patent [19]

Wanatowicz

[11] Patent Number: 5,038,468
[45] Date of Patent: Aug. 13, 1991

[54] METHOD OF INSERT MOLDING WITH WEB PLACED IN THE MOLD

[75] Inventor: Edward W. Wanatowicz, Elk Grove Village, Ill.

[73] Assignee: Illinois Tool Works Inc., Glenview, Ill.

[21] Appl. No.: 511,066

[22] Filed: Apr. 19, 1990

[51] Int. Cl.⁵ .................... B29C 45/14; H01R 43/00; H01L 21/60
[52] U.S. Cl. ........................ 29/882; 29/883; 29/884; 264/163; 264/272.11; 264/272.15
[58] Field of Search ............ 264/163, 272.11, 272.15; 29/883, 884, 527.4, 882

[56] References Cited

U.S. PATENT DOCUMENTS

| | | | |
|---|---|---|---|
| 4,801,561 | 1/1989 | Sankhagowit | 264/272.15 |
| 4,821,413 | 4/1989 | Schmitt et al. | 264/272.11 |
| 4,829,670 | 5/1989 | Hilgers | 29/883 |
| 4,859,632 | 8/1989 | Lumbard | 264/272.11 |
| 4,860,425 | 8/1989 | Kunisaki et al. | 29/527.4 |

Primary Examiner—Jan H. Silbaugh
Assistant Examiner—Angela Ortiz
Attorney, Agent, or Firm—Schwartz & Weinrieb

[57] ABSTRACT

A method of making a plastic terminal connector having a metal terminal set embedded therein in which the conductive contact members of the terminal set are electrically isolated from each other prior to the injection molding process. There is included a three-plated mold base which is formed from a lower movable mold plate, an intermediate mold plate, and an upper stationary mold plate. The upper mold plate includes a plurality of punches which extend through the spring-biased intermediate mold plate so as to cut connecting ties of the metal terminal set so as to form a plurality of individual electrically isolated conductive contact members when the mold is closed. The cutting operation is performed prior to the injection molding process as an integral part of loading the metal terminal set into the lower mold plate and securing the terminal set within the mold between the lower and intermediate mold plates when the mold is closed.

13 Claims, 2 Drawing Sheets

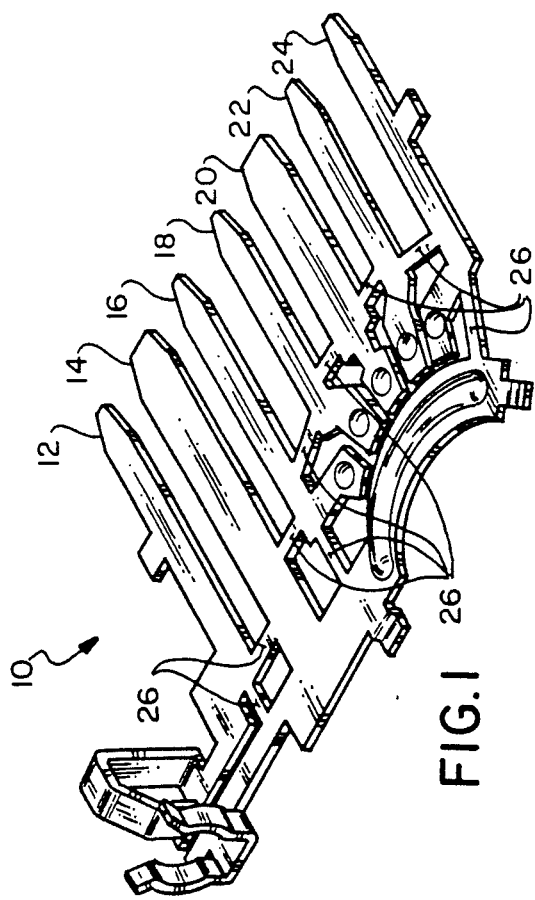
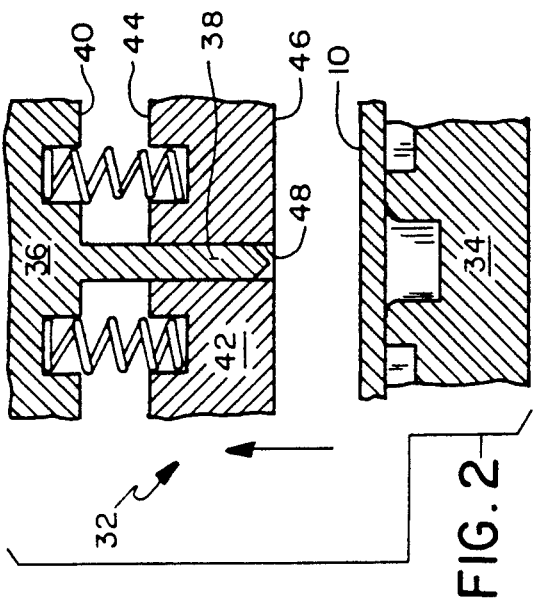

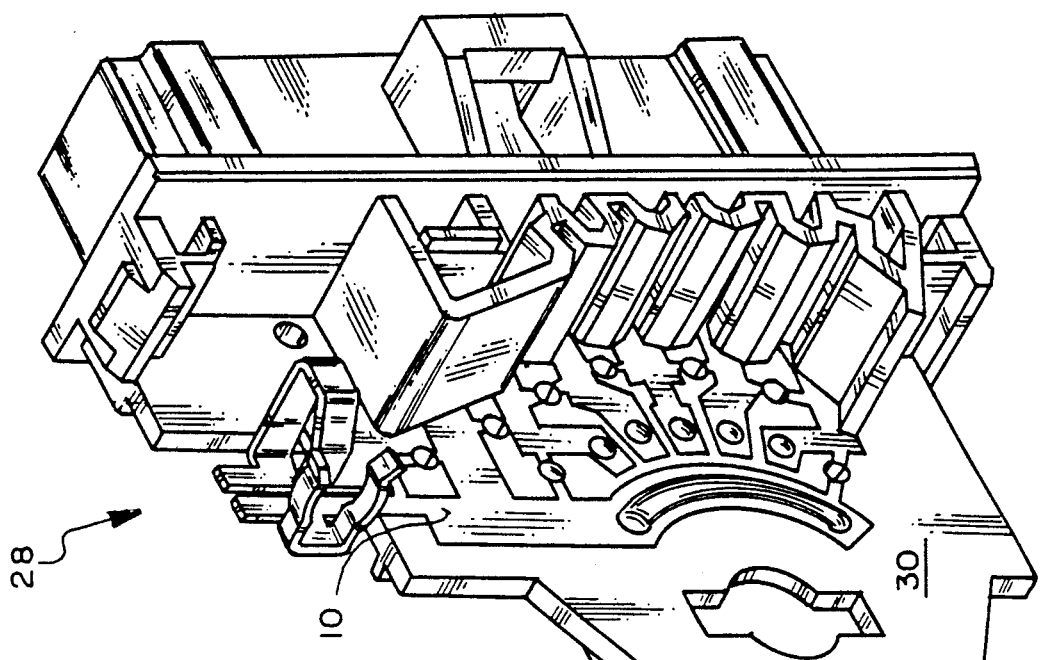
FIG. 10
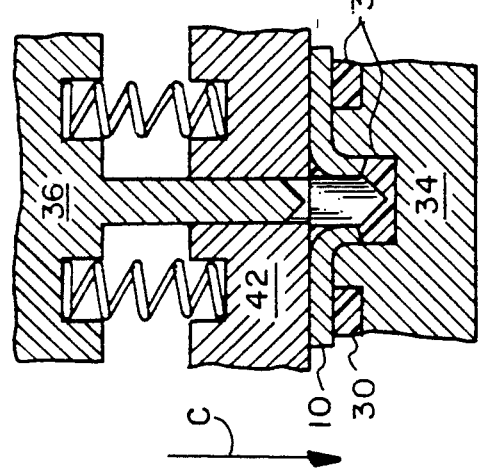
FIG. 7
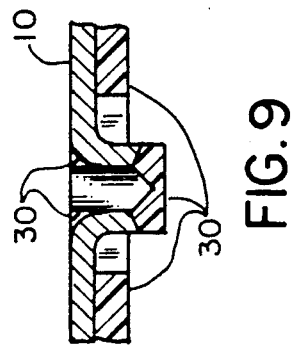
FIG. 9
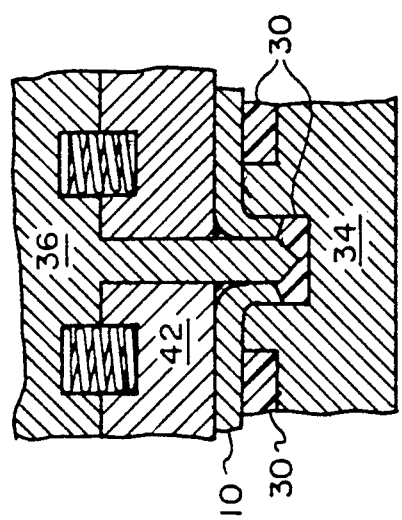
FIG. 6
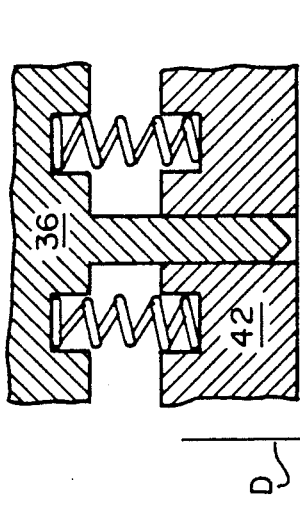
FIG. 8

METHOD OF INSERT MOLDING WITH WEB PLACED IN THE MOLD

FIELD OF THE INVENTION

This invention relates generally to electrical terminal connectors and more particularly, it relates to a method of making a terminal connector having a plastic housing and a metal terminal set embedded therein in which the conductive contact members of the terminal set are electrically isolated from each other prior to the injection molding process.

BACKGROUND OF THE INVENTION

As is known in the prior art, a metal terminal set formed as a unified structure is placed into an injection molding machine in which two halves of a mold are closed so as to form a cavity about the terminal set. Molten plastic is then forced into the cavity in a well-known manner and hardens about the terminal set so as to form a rigid plastic terminal connector housing having the metal terminal set embedded therein. The problem with this prior art technique is that the plurality of conductive contact members of the terminal set are still connected together as a unified structure by means of a plurality of connecting bars or links. This requires an additional and costly fabrication step, after the molded terminal connector is ejected from the mold, of cutting or severing the plurality of connecting bars in order to electrically separate the plurality of conductive contact members.

A prior art search directed toward the subject matter of this application was conducted in the U.S. Patent and Trademark Office and revealed the following patents; U.S. Pat. Nos. 3,344,309; 3,930,114; 4,785,532; 4,821,413; and 4,859,632.

However, none of the prior art uncovered in the search disclosed a three-plate mold base like that of the present invention wherein the upper mold plate having a plurality of punches extending through a spring-biased intermediate mold plate serves to cut a metal terminal set so as to form a plurality of individual conductive contact members when the mold is closed. The cutting operation is performed prior to the injection molding process as an integral part of clamping the metal terminal set between the upper and lower mold plates.

OBJECTS OF THE INVENTION

Accordingly, it is a general object of the present invention to provide a method of making a plastic terminal connector which comprises a minimum number of steps, thereby reducing manufacturing costs.

It is an object of the present invention to provide an improved method of making a plastic terminal connector having a metal terminal set embedded therein which does not require a fabrication step, subsequent to the injection molding step, of removing the terminal contact connecting bars in order to electrically separate the plurality of conductive contact members of the terminal set.

It is another object of the present invention to provide an improved method of making a plastic terminal connector having a metal terminal set embedded therein in which the conductive contact members of the terminal set are electrically isolated from each other prior to the injection molding process.

It is still another object of the present invention to provide a method of making a plastic terminal connector which includes a three-plate mold base wherein the upper mold plate having a plurality of punches mounted thereon and extending through a spring-biased intermediate mold plate serves to cut a metal terminal set so as to form a plurality of individual conductive contact members when the mold is closed.

SUMMARY OF THE INVENTION

In accordance with these aims and objectives, the present invention is concerned with the provision of a method of making a plastic terminal connector which includes the steps of inserting a terminal set into a first mold plate which receives the terminal set, the terminal set including a plurality of conductive contact members which are connected by means of connecting ties so as to define a unified web structure, moving the first mold plate against a second mold plate so that the web structure is held in place therebetween, cutting the connecting ties of the web structure by moving the first mold plate and the second mold plate against corresponding punches formed integrally with a third mold plate so as to provide discrete conductive contact members, forcing molten plastic into a mold cavity formed by means of the first and second mold plates, curing the molten plastic so as to form a terminal connector in which the conductive contact members are embedded in the plastic and are electrically isolated from each other, and moving the first mold plate away from the second and third mold plates so as to permit removal of the terminal connector.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several view, and wherein:

FIG. 1 is a perspective view of a terminal set used in practicing the method of the present invention;

FIG. 2 is a fragmentary, cross-sectional view of the terminal set of FIG. 1 shown in a mold cavity prior to closing of the mold cavity;

FIG. 3 is a fragmentary, cross-sectional view similar to FIG. 2, but illustrating the initial closing of the mold;

FIG. 4 is a fragmentary, cross-sectional view similar to FIG. 3, but illustrating the continued closing of the mold;

FIG. 5 is a fragmentary, cross-sectional view similar to FIG. 4, but illustrating the mold in its fully closed position and prior to the introduction of the molten plastic;

FIG. 6 is a fragmentary, cross-sectional view similar to FIG. 5, but illustrating the introduction of the molten plastic;

FIG. 7 is a fragmentary, cross-sectional view similar to FIG. 6, but illustrating the initial opening of the mold;

FIG. 8 is a fragmentary, cross-sectional view similar to FIG. 7, but illustrating the mold in its fully opened position subsequent to the molding operation;

FIG. 9 is a fragmentary, cross-sectional view of the finished plastic terminal connector constructed by means of the novel method of the present invention; and FIG. 10 is a perspective view of the finished plastic terminal connector of FIG. 9.

DESCRIPTION OF THE PREFERRED EMBODIMENT

Referring now to the various views of the drawings, there is illustrated in FIG. 1 a terminal set 10 which is stamped and formed from an electrically conductive metal such as, for example, brass, copper-iron alloy and the like. The terminal set 10 includes seven elongated conductive contact elements or members 12, 14, 16, 18, 20, 22 and 24 which extend in a parallel direction with respect to each other. The conductive contact members 12-24 are connected by means of a plurality of connecting bars or ties 26 so that the terminal set 10 forms a unified web structure.

The web structure 10 is placed into an injection molding machine (not shown) and the connecting ties 26 are cut or severed upon the initial closing of the mold prior to the injection of a thermoplastic resin such as, for example, glass-filled nylon into the mold. After injection of the plastic material into the mold which is then cured or hardened in a known manner, there is formed a finished plastic terminal connector 28 as illustrated in FIG. 10. As can be seen, the terminal set 10 is embedded within a surface 30 of the terminal connector 28 in which the conductive contact members 12-24 thereof have already been separated from each other so as to form discrete electrical contacts, terminals, or parts. The terminal set 10 of FIG. 1 should be compared with the terminal set 10 in FIG. 10. Thus, the conductive contact members 12-24 are electrically disconnected or isolated from each other in FIG. 10. As a result, a subsequent and costly fabrication step of cutting the connecting ties 26, as required in the prior art, has been eliminated so as to thereby reduce the manufacturing costs thereof.

The completed terminal connector 28 of FIG. 10 is preferably fabricated in accordance with the novel sequence of operational steps as depicted in FIGS. 2-9. Referring initially to FIG. 2, there is shown a three-plate mold base 32 of an injection molding machine, in diagrammatic form for the sake of clarity. The three-plate mold base 32 of the present invention includes a lower movable die or mold plate 34 for receiving the terminal set or web 10 of FIG. 1. The lower mold plate 34 may have positioning or locating pins which are insertable between the conductive contact members 12-24 of the web so as to insure that the contact members will be arranged within close tolerance limits at their predetermined positions. The mold base 32 further includes an upper stationary die or mold plate 36 having a plurality of punches 38 (one of which is shown) formed integrally with the lower surface 40 thereof.

The mold base 32 also includes a spring-biased movable intermediate die or mold plate 42 interposed between the upper and lower mold plates 34 and 36. The intermediate mold plate 42 has a top surface 44 and a lower surface 46. The mold plate 42 includes a plurality of openings 48 (one of which is shown) corresponding to the number of punches 38. The opening 48 extends between the top and lower surfaces and slidably receives therein the corresponding punch 38. The lower surface 46 of the mold plate 42 faces the upper surface of the terminal set 10.

As the movable plate 34 is initially closed by moving the same in the direction of arrow A to the position as shown in FIG. 3, the lower surface 46 of the intermediate mold plate 42 engages the top surface of the web 10 so as to hold the same in the desired position prior to punching or cutting of the connecting ties. As the movable mold plate 34 continues to close by movement in the direction of arrow B the web and the intermediate mold plate 42 are pushed upwardly to the position depicted in FIG. 4. In this position, the tip 50 of the punch 38 begins to pierce the web within the region of the connecting tie 26. It will be noted that the lower mold plate 34 is provided with a cavity 52 arranged below the area of the connecting tie 26 so as to accommodate the tip 50 of the punch 38 when the punch tip 50 fully pierces the web as shown in FIG. 5.

When the mold base 32 is in its fully closed position as illustrated in FIG. 5, the top surface of the intermediate mold plate 42 has been moved against the lower surface 40 of the stationary mold plate 36. Furthermore, the punch 38 has now been extended through and cuts an opening 54 within the connecting tie 26 so as to electrically isolate the plurality of conductive contact members. Simultaneously, the tie portions 26a, 26b are driven downwardly into the cavity 52 so as to engage mold 34 and thereby assist at holding the contact members in their desired positions during the molding operation. In addition, gaps 56 are formed just below the lower surface of the intermediate mold plate 42 adjacent the cut opening 54.

After the movable mold plate 34 has been moved to its fully closed position, fluid plastic is injected into a mold cavity (not shown) formed by means of the mold plates 34 and 42 so as to fill the mold cavity as well as the cavities 52 and gaps 56 with plastic as illustrated in FIG. 6 whereby the plastic material is then cured or hardened in a known manner. It will be noted that by injecting the plastic into the cavities 52 and gaps 56, the tie portions 26a, 26b are tightly molded in place so as to permit a stronger bond therebetween.

As the movable mold plate 34 is initially opened by movement in the direction of arrow C to the position as shown in FIG. 7, the upper surface 44 of the intermediate plate 42 is pushed downwardly away from the lower surface 40 of the stationary mold plate 36 under the biasing force of the springs while the lower surface 46 of mold plate 42 is still held against the top surface of the terminal set 10 due to the spring force. As the movable mold plate 34 continues to open by movement in the direction of arrow D, the movable mold plate 34 is returned to its original position, as illustrated in FIG. 8, with the finished terminal connector 28 disposed therein. The finished terminal connector 28, after its removal from the lower movable plate 34, is illustrated in FIG. 9.

From the foregoing detailed description, it can thus be seen that the present invention provides an improved method of making a plastic terminal connector having a metal terminal set embedded therein in which the conductive contact members of the terminal set are electrically isolated from each other prior to the injection molding process. The method of the present invention includes a three-plate mold base wherein the upper mold plate having a plurality of punches extending through a spring-biased intermediate mold plate serves to cut a metal terminal set so as to form a plurality of individual, electrically isolated conductive contact members when the mold is closed. The cutting operation is performed prior to the injection molding process as an integral part of clamping the metal terminal set between the intermediate and lower mold plates.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made so as to adapt the present invention to a particular situation or to adapt particular material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A method of making a plastic terminal connector comprising the steps of:
    inserting a terminal set into a first mold plate which receives the terminal set, said terminal set including a plurality of conductive contact members which are electrically connected by connecting ties so as to define a unified web structure;
    moving the first mold plate against a second mold plate so that the web structure is held in place therebetween and so that portions of each of the plurality of conductive contact members are positioned within a mold cavity defined between the first and second mold plates;
    cutting the connecting ties in the web structure by moving the first mold plate and the second mold plate against corresponding punches formed integrally in a third mold plate so as to provide discrete conductive contact members;
    then forcing a molten plastic into the cavity defined between the first and second mold plates;
    curing the molten plastic to form a terminal connector in which the discrete conductive contact members are embedded in the plastic and are electrically isolated from each other; and
    moving the first mold plate away from the second and third mold plates so as to permit removal of the terminal connector.

2. A method as claimed in claim 1, wherein said first mold plate comprises a lower movable die plate.

3. A method as claimed in claim 2, wherein said second mold plate comprises a spring-biased intermediate die plate.

4. A method as claimed in claim 3, wherein said third mold plate comprises an upper stationary die plate having corresponding punches formed in its lower surface.

5. A method as claimed in claim 4, wherein said second mold plate includes openings extending between its top and bottom surfaces for receiving the corresponding punches therebetween.

6. A method of making a plastic terminal connector comprising the steps of:
    inserting a terminal set into a first mold plate which receives the terminal set, said terminal set including a plurality of conductive contact members which are electrically connected by connecting ties so as to define a unified web structure;
    moving the first mold plate against a second mold plate so that the web structure is held in place therebetween and so that portions of each of the plurality of conductive contact members are positioned within a mold cavity defined between the first and second mold plates;
    cutting openings in the connecting ties in the web structure by moving the first mold plate and the second mold plate against corresponding punches formed integrally in a third mold plate so as to provide discrete conductive contact members;
    wrapping portions of the connecting ties into recesses defined in the first mold plate below the cut openings for holding the discrete conductive contact members in their desired positions;
    then forcing a molten plastic into the cavity defined between the first and second mold plates;
    curing the molten plastic to form a terminal connector in which the discrete conductive contact members are embedded in the plastic and are electrically isolated from each other; and
    moving the first mold plate away from the second and third mold plates so as to permit removal of the terminal connector.

7. A method as claimed in claim 6, wherein said first mold plate comprises a lower movable die plate.

8. A method as claimed in claim 7, wherein said second mold plate comprises a spring-biased intermediate die plate.

9. A method as claimed in claim 8, wherein said third mold plate comprises an upper stationary die plate having corresponding punches formed in its lower surface.

10. A method as claimed in claim 9, wherein said second mold plate includes openings extending between its top and bottom surfaces for receiving the corresponding punches therebetween.

11. A method of making a plastic terminal connector comprising the steps of:
    inserting a terminal set into a first mold plate which receives the terminal set, said terminal set including a plurality of conductive contact members which are electrically connected by connecting ties so as to define a unified web structure;
    moving the first mold plate against a second mold plate so that the web structure is held in place therebetween and so that portions of each of the plurality of conductive contact members are positioned within a mold cavity defined between the first and second mold plates;
    cutting openings in the connecting ties in the web structure by moving the first mold plate and the second mold plate against corresponding punches formed integrally in a third mold plate so as to provide discrete conductive contact members;
    wrapping portions of the connecting ties into recesses defined in the first mold plate below the cut openings for holding the discrete conductive contact members in their desired positions and simultaneously defining gaps above the cut openings;
    then forcing a molten plastic into the cavity defined between the first and second mold plates and into the recesses and gaps so as to provide a tighter engagement between the discrete contact members and the plastic;
    curing the molten plastic to form a terminal connector in which the discrete conductive contact members are embedded in the plastic and are electrically isolated from each other; and
    moving the first mold plate away from the second and third mold plates so as to permit removal of the terminal connector.

12. A method of making a terminal connector, comprising the steps of:

inserting an electrically conductive terminal set, which comprises a plurality of electrically conductive contact members which are electrically connected together by means of connecting so as to define a unified, integral, one-piece electrical terminal web structure, within a first mold means;

moving said first mold means against a second mold means such that said web structure is interposed between said first and second mold means and such that portions of each of said plurality of electrically conductive contact members are positioned within a mold cavity defined between said first and second mold means, said second mold means being provided with a plurality of punch means for severing said connecting ties of said web structure as said first and second mold means are moved toward each other so as to electrically isolate each one of said electrically conductive contact members from each other in order to define discrete electrically isolated electrical circuit members;

then forcing a molten plastic material into said cavity defined between said first and second mold means so as to embed said web structure, including said discrete electrically isolated conductive contact members, within said plastic material;

curing said molten plastic material so as to form a terminal connector within which said web structure, including said discrete electrically isolated conductive contact members, is embedded; and moving said first and second mold means away from each other so as to permit removal of said terminal connector, including said plastic material with said web structure and said discrete electrically isolated conductive contact members embedded therein, from said first and second mold means.

13. A method as set forth in claim 12, wherein:
said first mold means comprises a first movable mold plate upon which said web structure is seated; and
said second mold means comprises a second mold plate for cooperating with said first mold plate in retaining said web structure within said cavity defined between said first and second mold means, and a third mold plate which is stationary and against which said first and second mold plates are moved when said first and second mold means are closed, said third mold plate means including said plurality of punch means which are movable through corresponding bores, provided within said second mold plate as said second mold plate is moved toward said third mold plate, so as to pierce said web structure and sever said connecting ties so as to define said discrete electrically isolated conductive contact members.

* * * * *